(12) United States Patent  
Stein

(10) Patent No.: US 9,497,253 B2  
(45) Date of Patent: Nov. 15, 2016

(54) AUTHORIZATION REVIEW SYSTEM

(71) Applicant: Dropbox, Inc., San Francisco, CA (US)

(72) Inventor: David Stein, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 276 days.

(21) Appl. No.: 14/249,117

(22) Filed: Apr. 9, 2014

(65) Prior Publication Data

US 2015/0295851 A1    Oct. 15, 2015

(51) Int. Cl.
| | |
|---|---|
| G06F 21/53 | (2013.01) |
| H04L 29/08 | (2006.01) |
| G06F 21/12 | (2013.01) |
| H04L 29/06 | (2006.01) |
| G06F 11/00 | (2006.01) |

(52) U.S. Cl.
CPC ............ *H04L 67/02* (2013.01); *G06F 21/128* (2013.01); *G06F 21/53* (2013.01); *H04L 63/102* (2013.01); *H04L 67/1002* (2013.01); *G06F 11/004* (2013.01)

(58) Field of Classification Search
CPC ........................... G06F 21/00; G06Q 20/3674
See application file for complete search history.

(56) References Cited

U.S. PATENT DOCUMENTS

| | | | |
|---|---|---|---|
| 7,231,661 B1 | 6/2007 | Villavicencio et al. | |
| 7,401,143 B2 | 7/2008 | Oulu et al. | |
| 7,953,758 B2 | 5/2011 | Takatsu et al. | |
| 8,826,443 B1* | 9/2014 | Raman | G06F 11/004 726/26 |
| 2003/0233447 A1 | 12/2003 | Fellenstein et al. | |
| 2004/0186809 A1* | 9/2004 | Schlesinger | G06F 21/6218 705/50 |
| 2007/0006325 A1 | 1/2007 | Gargaro | |
| 2007/0150296 A1* | 6/2007 | Ramcharran | G06Q 10/06 715/221 |
| 2009/0172636 A1 | 7/2009 | Griffith et al. | |
| 2009/0187666 A1* | 7/2009 | Benschop | G06F 9/468 709/229 |
| 2010/0223475 A1* | 9/2010 | MacFarlane | G06F 21/53 713/189 |
| 2010/0312847 A1* | 12/2010 | Boberg | H04M 3/42374 709/206 |
| 2012/0042384 A1* | 2/2012 | Badhwar | G06F 21/128 726/25 |

OTHER PUBLICATIONS

Vinoski, Steve, "Chain of Responsibility", IEEE Computer Society, Nov. 2002, pp. 80-83.

* cited by examiner

*Primary Examiner* — Barbara Burgess  
(74) *Attorney, Agent, or Firm* — Hickman Palermo Becker Bingham LLP

(57) ABSTRACT

A computer system can provide user interfaces and back-end operations to facilitate review of the web requests. The system can detect whether an operation of an application called by a web request includes a review tag or a call to a review method. If a review tag or a call to a review method is detected, the middleware can initiate a review process that can include receiving input from a client device associated with a human reviewer. Upon receiving approval by the reviewer, the web request can be generated using a saved version of the original web request and executed. Thus, this review process can run without requiring that code for reviewing the web request be contained within the web request or the application called by the web request.

20 Claims, 7 Drawing Sheets

AUTHORIZATION REVIEW SYSTEM

BACKGROUND OF THE INVENTION

The present disclosure relates generally to code management systems for computer systems and in particular to a review flow for processing code execution requests in such a system.

Many traditional code management systems provide methods for reviewing code before it is pushed to a target computer system. For example, code repositories may be used to upload new code for review before it is executed on the target system. The new code may be reviewed, based on various factors, to determine whether it should be pushed to the system. Other code management systems use restrictions (e.g., user authorization requirements) to simply prevent the unauthorized execution of code on a target computer system.

These traditional code management systems may not be suitable for some applications. More specifically, code repositories may not be well suited for applications where code is frequently executed on the computer system. Furthermore, while authorization requirements may prevent unauthorized actions, authorization requirements may insufficiently mitigate risk associated with authorized actions that have the potential to result in unintended, adverse consequences. On the other hand, a system that requires building an approval flow into every code submission may be too labor-intensive.

BRIEF SUMMARY OF THE INVENTION

Certain embodiments of the present invention relate to techniques (e.g., systems, methods, code or instructions executed by one or more processors) for reviewing web requests as they are received and before or after the web requests start executing at a computer system. In some embodiments, the techniques can provide user interfaces and back-end operations to facilitate review of the web requests.

In some embodiments, an application server is provided that includes middleware for reviewing requests (e.g., a web request created by a human requester using a client device) to execute operations of applications. For example, the middleware can detect whether an operation of a web application called by the web request includes operations associated with a review tag or a call to a review method. If a review tag or a call to review method is detected, the middleware can initiate a review process, which can include receiving input from a client device associated with a human reviewer. More specifically, the review process can freeze the execution of the web application, serialize the state of the web request and data associated therewith and send the saved web request to a human reviewer. If the web request is approved, the middleware can generate a new web request using the saved web request and send it to the web application of the application server for execution.

Thus, in embodiments of this computer system, a web application can be executed on an application server upon request by authorized requesters and without additional review, but web requests for the performance of certain operations of a web application (e.g., tagged operations) can trigger a review process. For example, in a customer service context, it may be desirable to review operations that relate to customer service interactions and/or that can have a significant effect on a customer's account. That is, even if the requester of customer service related operations of a web application has authorization to execute such a request, reviewing these requests may still be desirable because the operations are "high risk" (e.g., have the potential to result in adverse consequences that may justify additional review).

Embodiments of this review process can take place at middleware separate from a web application wherein the web application is executed in response to a web request. In addition, this review process can be implemented in environments that run interpreted programming languages as well as compiled programming languages. In some embodiments (e.g., in interpreted programming language environments), the middleware can detect a review tag when a web request is sent to it by a web application because an exception was thrown during the execution of the web application per the web request. In some embodiments (e.g., in complied programming language environments), the middleware can detect a tag or a call to a review method when inspecting the web request. In the aforementioned embodiments, the review process can run without requiring code for reviewing the web request contained within the web request or the web application. Instead, the middleware can contain the code for the review method, which can be executed upon detection of the review tag or call to review method by the middleware.

The following detailed description together with accompanying drawings, will provide a better understanding of the nature and advantages of the present invention.

DETAILED DESCRIPTION OF THE INVENTION

Certain embodiments of the present invention relate to techniques (e.g., systems, methods, code or instructions executed by one or more processors) for reviewing code (e.g., web requests). In some embodiments, the system can provide user interfaces and back-end operations to facilitate review of the web requests.

Figure 1:
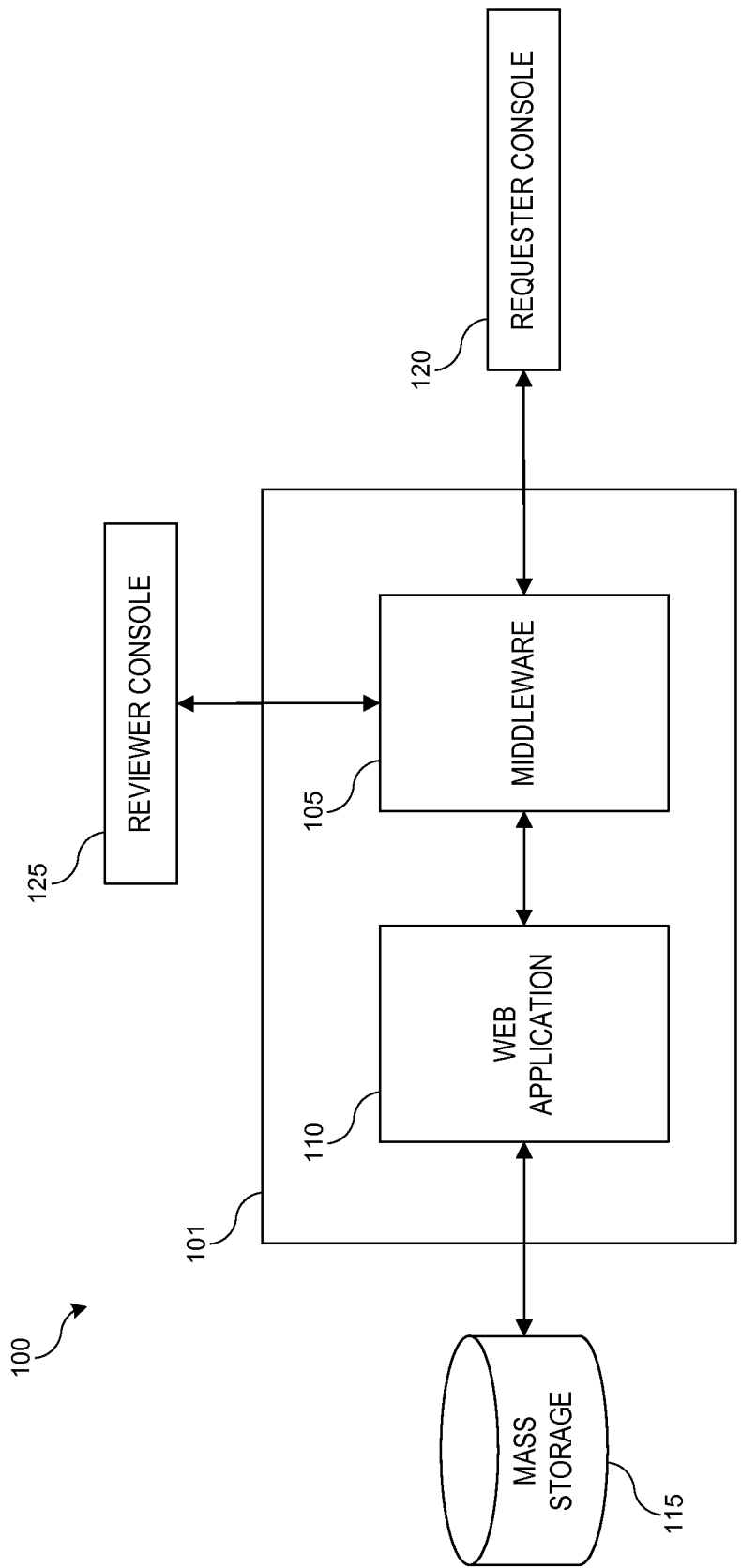
FIG. 1 shows a computer system that can be used to implement a review method in a distributed computing architecture according to an embodiment of the present invention.

Methods and systems of reviewing web requests can be implemented in a variety of standalone computer systems and/or distributed computing architectures. FIG. 1 shows computer system 100 that can be used to implement a review method (or aspects thereof) in a distributed computing architecture according to an embodiment of the present invention.

Computer system 100 can have a modular design that incorporates an application server 101, which includes middleware 105 and web application 110, and mass storage subsystem 115. Application server 101 can process a web request (e.g., an HTTP request) that is submitted via a requester at requester console 120, which can be a client device that includes a web interface. A requester (e.g., a human operator authorized to access computer system 100) can create and submit a web request by using the web interface (e.g., an interface that includes a graphical user interface such as a web form or a command line including raw code or a script) at the requester console to fill out a web form. This web request can include a call to an application (e.g., web application 110) that includes "high risk" operations associated with a review tag or a call to a review method.

For example, in embodiments where computer system 100 is a platform for providing web services to users, the web request can include a call to an application (e.g., web application 110) that performs operations such as applying changes to a user's web service account on system server 100 or controlling the way in which operators of computer system 100 interact with users of the web service. These operations can be considered "high risk" because they can directly affect users and could result in a negative user experience if inadvertently or inappropriately performed. For example, submitting a web request that inadvertently reverts a user's account to a previous version or submitting a web request that sends an inappropriate communication to a user are potential outcomes of some exemplary "high risk" operations.

In order to avoid the above examples and other potential negative outcomes, "high risk" operations can be associated with a review tag or a call to a review method so that a reviewer (e.g., another human operator) can review or double-check the "high risk" operations before they are executed, even if the submitting requester is authorized to submit web requests that, upon execution, invoke "high risk" operations of an application. For example, operations within web application 110 can be associated with review tags or calls to review methods by including them near the HTML or other code of the operations. Reviewer console 125, which can be another client device that includes a web interface, can provide an interface at which a reviewer (e.g., a human operator authorized to access computer system 100 and review web requests submitted by requesters) can review web requests. The web request can be simulated at the interface, whereupon the reviewer can provide an input corresponding to an approval or a disapproval of the web request. If approved, the web request can be sent to and executed to completion at application server 101. If the web request is disapproved or rejected, execution of the web request can be halted, and the web request can be logged and/or sent back to the requester (e.g., for requester review at requester console 120). Additional details and examples of this review process are discussed below.

The process for detecting review tags and initiating or invoking a review of a web request can vary, e.g., depending on the programming language of the applications stored on computer system 100. However, regardless of the specific process implemented on a computer system, a review of a web request can run without requiring that code for reviewing the web request be included with the web request or in the web application (e.g., web application 110) called by the web request. Instead, middleware 105 can include the code for the review method. In addition, a load balancer can initially be used to route the web request to a server or servers of computer system 100.

In some embodiments (e.g., where the programming language of the applications on application server 101 is an interpreted programming language such as Python or Ruby), middleware 105 can detect a review tag by virtue of receiving a web request from web application 110. More specifically, if web application 110 generates or receives a signal during the execution of a web request, a review method can be invoked or initiated and web application 110 can halt execution of the web request, save the web request and send the web request to middleware 105. For example, if a call function is invoked or an exception is thrown during the execution of a web request at web application 110, a review method can be invoked or initiated and web application 110 can halt execution of the web request, save the web request and send the web request to middleware 105. The review method for reviewing the web request can be included in middleware 105 and initiated when the review tag is detected by middleware 105 (e.g., upon receipt of the web request from web application 110), thereby obviating the need to include the review method in the web request or at the application (e.g., web application 110) called upon by the web request. In this manner, a web request can begin execution at web application 110, but will not be fully executed until after the review process is completed and the web request is approved by the reviewer. Additional examples of methods that can be used to facilitate the review of a web request are described in further detail below.

In some embodiments (e.g., where the programming language of the applications executing on application server 101 is a compiled programming language such as C++ or Fortran), middleware 105 can detect a review tag or a call to a review method when inspecting or processing the web request. Detecting a review tag can initiate a review process similar to the review process described above where the review tag is detected when an exception is thrown, except that in this case the web request would not be sent to middleware 105 by web application 110 and middleware 105 would save the web request before the web request is reviewed. Examples of methods that can facilitate the review of a web request for complied programming language embodiments of application server 101 are described in further detail below.

Middleware 105 can act as an interface between web applications, including web application 110, and client computers, including requestor console 120 and reviewer console 125. In some embodiments, middleware 105 can be Web Server Gateway Interface (WSGI), which provides an interface between web applications, and web servers using Python, however other interfaces and/or middleware services supporting different languages and protocols can also be used. In some embodiments, middleware 105 can provide various services such as authentication, authorization, spell-checking, compliance checking, regeneration and load balancing of messages or requests received from the client computers, as described herein.

It will be appreciated that the computer system of FIG. 1 is illustrative and that variations and modifications are possible. The operations of middleware 105 can be performed partially or fully by other servers of computer system 100. For example, web application 110 can include a middleware layer for handling some or all of the operations of middleware 105 described herein. As another example, client devices can also include middleware that works alone or in tandem with middleware 105 and/or web application 110 to handle some or all of the operations of middleware 105 described herein. Alternatively, middleware 105 can be wholly implemented on a separate middleware server. For example, computer system 100 can have a modular design and include a standalone server for each of middleware 105 and web application 110.

Figure 2:
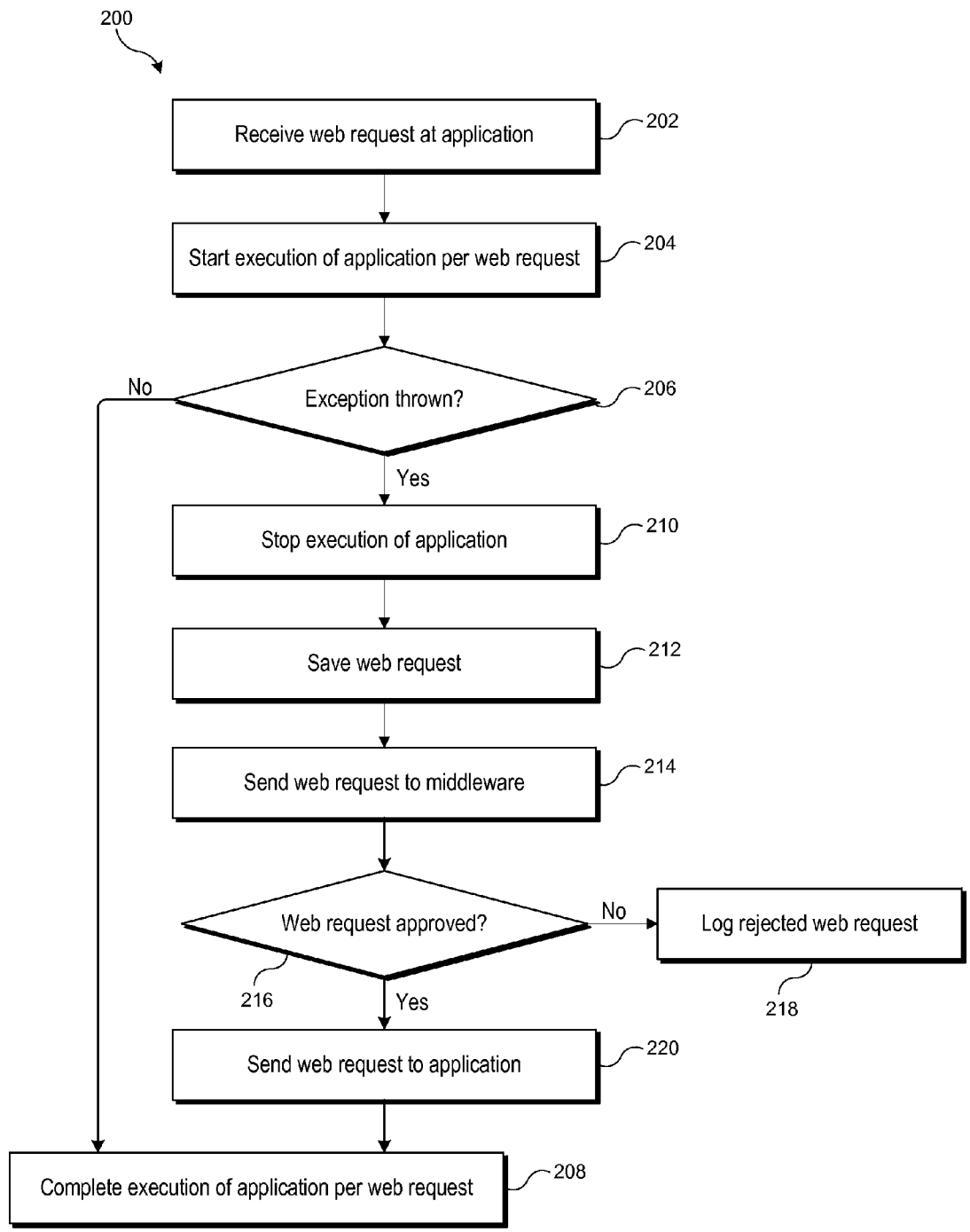
FIG. 2 shows a flow diagram of a process for reviewing and approving or disapproving web requests using a computer system according to an embodiment of the present invention.

FIG. 2 shows a flow diagram of process 200 for reviewing and approving or disapproving web requests using a computer system (e.g., a computer system that runs interpreted language applications) according to an embodiment of the present invention. Process 200 (or aspects thereof) can be implemented, e.g., in consoles 120 and 125 of FIG. 1, and can present various user interface screens, such as the screen described below with reference to FIG. 6.

Figure 7:
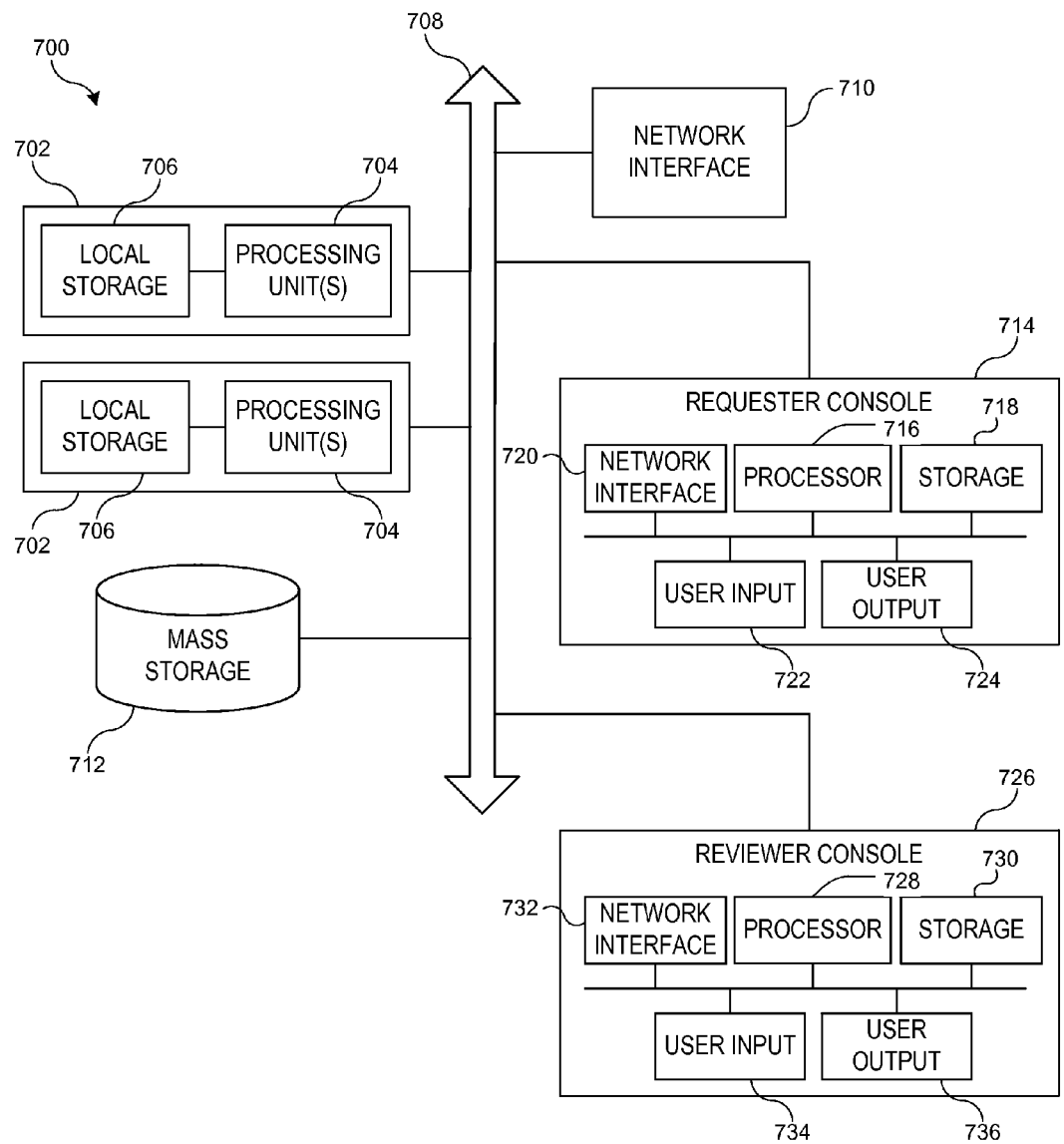
FIG. 7 shows additional details of an embodiment of a computer system that can be used to implement a review method (or aspects thereof) in a distributed computing architecture according to an embodiment of the present invention.

Process 200 can begin at block 202, with receiving a web request at a computer system (e.g., computer systems 100 and 700 of FIGS. 1 and 7, respectively). More specifically, the web request can be received at an application (e.g., web application 110 of FIG. 1) executing on an application server of the computer system. The web request can be created and sent by a human requester using a client device such as requester consoles 120, 714 (as shown in FIGS. 1 and 7). For example, a requester can use a client device to fill out a web form to create a web request that includes a call to an application (e.g., web application 110). The application can include a number of operations that can be performed in response to a web request. Some of those operations can be "high risk" operations, as discussed above. These "high risk" operations can be tagged or otherwise associated with a review tag or a call to a review method such that an exception will be thrown before the "high risk" operations are executed. For example, a call to a review method can be included somewhere in the code associated with the web request, e.g., within the application code called by the web request.

In some embodiments, the web request can first pass through middleware (e.g., middleware 105, which can include WSGI middleware) before being executed at an application (e.g., web application 110). The middleware can perform operations on the web request such that it can be properly executed via the application. The middleware can also determine whether the web request is properly authenticated and authorized before passing the web request to the application. Again, as mentioned above, methods of the present invention can initiate a review of a web request even if it is authenticated and authorized. However, if a web request is not authorized and authenticated, then the web request can be rejected without further review of the web request.

At block 204, execution of an application per the received web request can be started. For instance, operations of the application can be sequentially performed per the web request. Based on whether a "high risk" operation is called, process 200 can perform subsequent actions.

For example, at block 206, if an exception is not thrown because a "high risk" operation is not invoked when the web request is executed, then the execution of the application per the web request can be allowed and completed at block 208. In some embodiments, at the conclusion of block 208, confirmation of the completed execution of the web request can be sent to the requester, e.g., an indication of web request completion can be displayed at a user interface of a requester console (e.g., requester consoles 120 and 714, as shown in FIGS. 1 and 7, respectively). Alternatively, a web request log file can be generated for each web request as it is executed. Once execution of a web request has been completed, its log file can be stored (e.g., at local storage 706, as shown in FIG. 7). In some embodiments, web request log files can be preserved indefinitely; in other embodiments, web request log files can be subject to periodic purges (e.g., after 30 days, 90 days, one year, or the like). These web request log files can be accessed by the requester in order to ascertain the status of a web request.

At block 210, if an exception is thrown because a "high risk" operation is invoked upon execution of a web request, the execution of the application per the web request can be stopped (e.g., web application 110 can freeze the state of the web request, and a review method, as described with reference to the following blocks, can be invoked or initiated). At block 212, the web request, including the state, which includes attributes and/or fields of the web request, can be saved.

At block 214, the saved web request is sent or returned to the middleware for review. In this manner, the middleware can detect that the returned web request, upon execution, invokes an operation associated with a review tag, e.g., a "high risk" operation, by virtue of the fact that it is receiving a web request from the application. The review tag or the call to a review method can be used to determine a review method, which can be included in the middleware. For example, the middleware can access information (e.g., information stored at mass storage 115) concerning which review methods correspond to which review tags. This information could be used to determine a review method using the detected review tag. Alternatively, the call to a review method can be used to determine a review method included in the middleware. As such, the review method can be included in the middleware and initiated when the review tag or a call to a review method is detected by the middleware (e.g., upon receipt of the web request by middleware 105 and from web application 110), thereby obviating the need to include the review method with the web request or within the application called upon by the web request.

The review method can be used to determine appropriate reviewer(s) and then send or provide the saved web request to reviewer console(s) (e.g., reviewer consoles 125 and 726, as shown in FIGS. 1 and 7, respectively) associated with the determined reviewer(s) such that the human reviewer(s) can review the web request. Alternatively, the web request can merely be logged, instead of being sent to the reviewer console, and later accessed by a reviewer in order to review the web request.

The web request can be reviewed at the review console by simulating the execution of the web request on a review interface at a user output (e.g., user output 736 of FIG. 7). For example, the reviewer can use the review interface to search for and/or view saved web requests received by the review console or even those logged at the application server. Thereafter, the reviewer can select a saved web request, thereby initiating a simulation of the web request. After viewing a simulation of the web request, the reviewer can approve or disapprove the web request, e.g., based on whether it is performing a correct and/or appropriate action. The reviewer can provide input (e.g., using user input 734, as shown in FIG. 7) that is detectable by the middleware and corresponding to an approval or disapproval of the saved web request. Examples of review interfaces at which a reviewer can search and/or select saved web requests and approve or disapprove web requests are described in further detail below.

Where the saved web request is sent to multiple reviewers, the approval and/or disapproval of one or more reviewers can be required in order for process 200 to perform subsequent actions. Conflicting approval/disapproval responses from multiple reviewers can be resolved according to a predetermined set of rules (e.g., certain reviewer(s)' approval(s) can overrule another reviewer(s)' disapproval(s) and vice versa or a web request can be deemed approved when the number of approval responses exceeds the number of disapproval responses and vice versa). Based on whether the web request is approved or disapproved, process 200 can perform subsequent actions.

For example, at block 216, if the web request is disapproved, then the disapproved or rejected web request can be logged at block 218. For example, once a web request is rejected, its status can be stored on its web request log file, as discussed above. These web request log files can be reviewed by a requester at the requester console in order to ascertain why the web request was rejected. The requester can also revise and resubmit the web request as appropriate at the requester console. Alternatively, the rejected web request can be sent directly to the requester console for further review by the requester.

If the web request is approved at block 216, then the approved web request can be sent to the application by the middleware at block 220. An embodiment of a process associated with block 216 (e.g., a process that occurs between blocks 214 and 220 when the web request is approved) is discussed below with reference to FIG. 5. The approved web request can be a new web request generated using the saved web request. The new web request can be adapted such that the new web request will not throw an exception after being sent back to the application at block 220. At block 208, as with web requests that do not throw an exception, the application called by the new web request can be allowed to execute to completion per the instructions of the new web request.

It will be appreciated that process 200 is illustrative and that variations and modifications are possible. For example, in some embodiments, a web request sent to middleware at block 214 is not directly sent to the requester console for approving/disapproving at block 216. Instead, the web request can be logged and subsequently accessed by a reviewer such that the web request is provided at the requester console for review by the reviewer. Furthermore, the simulation of the web request at the requester console can run differently based on the review tag associated with operations of the web request. Some review tags can even include a call to a method at the middleware for running a check function on the web request before simulation of the web request is sent to the reviewer console or displayed at the user output of the reviewer console. For example, spellcheck or other compliance check functions can be run on the web request before simulating the web request at the review console and the result of the functions can be provided at the review interface for the reviewer's reference.

Although process 200 is described above as depending on whether an exception is thrown at block 206, block 206 is not intended to be limited to that scope. In some embodiments, block 206 may depend on other triggers. For example, block 206 may determine whether the application (e.g., web application 110) has generated or received a signal during the execution of a web request, as described above with reference to FIG. 1. Based on whether the application has generated or received a signal during the execution of a web request, process 200 can perform subsequent actions. For example, if the application does not generate or receive a signal during the execution of a web request because a "high risk" operation is not invoked when the web request is executed, then the execution of the application per the web request can be allowed and completed at block 208. However, if the application does generate or receive a signal during the execution of a web request because a "high risk" operation is invoked when the web request is executed, then the execution of the application per the web request can be stopped at block 210 (e.g., web application 110 can freeze the state of the web request and a review method can be invoked or initiated).

Figure 3:
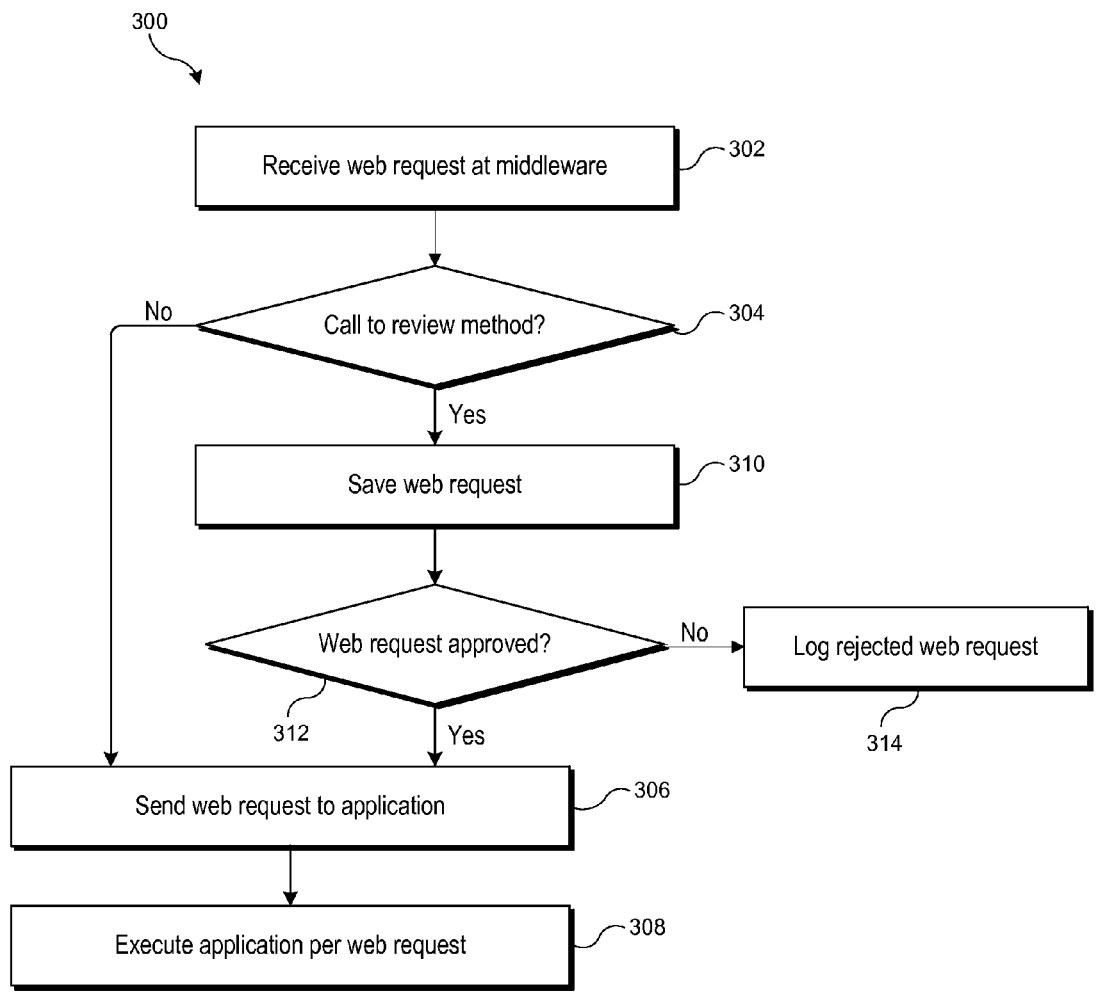
FIG. 3 shows a flow diagram of another process for reviewing and approving or disapproving web requests in a computer system according to an embodiment of the present invention.

FIG. 3 shows a flow diagram of process 300 for reviewing and approving or disapproving web requests in a computer system (e.g., a computer system that runs complied language applications according to an embodiment of the present invention). Process 300 (or aspects thereof) can be implemented, e.g., in consoles 120 and 125 of FIG. 1, and can present various user interface screens, such as the screen described below with reference to FIG. 6.

Process 300 can begin at block 302, with receiving a web request at a computer system (e.g., computer systems 100 and 700 of FIG. 1 and FIG. 7, respectively). More specifically, the web request can be received at middleware (e.g., middleware 105) executing on an application server of the computer system per rules of the computer system. The web request can be created and sent by a human requester using a client device such as requester consoles 120, 714 (as shown in FIGS. 1 and 7). For example, a requester can use a client device to fill out a web form to create a web request that includes a call to an application (e.g., web application 110). The application can include a number of operations that can be performed in response to a web request. Some of those operations can be "high risk" operations, as discussed above. These "high risk" operations can be associated with a review tag or a call to a review method. For example, a call to a review method can be included somewhere in the code associated with the web request, e.g., within the application called by the web request. Based on whether the web request, upon execution, invokes a "high risk" operation associated with a review tag or a call to a review method, process 300 can perform subsequent actions.

For example, at block 304, if no operation is detected that is associated with a review tag or a call to a review method, the web request can be sent to an application (e.g., web application 110, as shown in FIG. 1) at block 306. For instance, the middleware can inspect the received web request to determine whether the operations of an application called by the web request include a review tag or a call to a review method. As mentioned above, the review method can be included in the middleware and initiated when a call to a review method is detected by the middleware. In this manner, the need to include the review method with the web request or within the application called upon by the web request is obviated.

At block 308, the application called by the web request can be allowed to execute per the web request. In some embodiments, at the conclusion of block 308, confirmation of the complete execution of the web request can be sent to the requester, e.g., an indication of web request completion can be displayed at a user interface of a requester console (e.g., requester consoles 120 and 714, as shown in FIGS. 1 and 7, respectively). Alternatively, a web request log file can be generated for each web request as it is executed. Once execution of a web request has completed, its log file can be stored (e.g., at local storage 706, as shown in FIG. 7) where it can remain until it is no longer of interest. In some embodiments, web request log files can be preserved indefinitely; in other embodiments, web request log files can be subject to periodic purges (e.g., after 30 days, 90 days, one year, or the like). These web request log files can be reviewed by a requester in order to ascertain the status of a web request.

However, if an operation is detected that is associated with a tag or a call to review method (e.g., tagged for review) at block 304, the middleware server can freeze the state of the web request. An embodiment of a process associated with block 304 (e.g., a process that occurs between blocks 302 and 310 when a review tag is detected) is discussed below with reference to FIG. 4. At block 310, the web request, including the state, which includes one or more attributes or fields of the web request, can be saved. At this point, the review method can be invoked or initiated. This review method can begin by sending or providing the saved web request to a reviewer console (e.g., reviewer consoles 125 and 726, as shown in FIGS. 1 and 7, respectively) where a human reviewer can review the web request. Alternatively, the web request can merely be logged, instead of being sent to the reviewer console, and later accessed by a reviewer in order to review the web request.

The web request can be reviewed at the review console by simulating the execution of the web request on a review interface at a user output (e.g., user output 736 of FIG. 7). For example, the reviewer can use the review interface to search for and/or view saved web requests received by the review console or those logged at the application server. Thereafter, the reviewer can select a saved web request, thereby initiating a simulation of the web request. After viewing a simulation of the web request, the reviewer can approve or disapprove the web request, e.g., based on whether it is performing a correct and/or appropriate action. Examples of review interfaces at which a reviewer can search and/or select saved web requests and approve or disapprove web requests are described in further detail below.

Where the saved web request is sent to multiple reviewers, the approval and/or disapproval of one or more than one reviewers can be required in order for process 300 to perform subsequent actions. Conflicting approval/disapproval responses from multiple reviewers can be resolved according to a predetermined set of rules (e.g., certain reviewer(s)' approval(s) can overrule another reviewer(s)' disapproval(s) and vice versa and a web request can be deemed approved when the number of approval responses exceeds the number of disapproval responses and vice versa). Based on whether the web request is approved or disapproved, process 300 can perform subsequent actions.

For example, at block 312, if the web request is disapproved, the disapproved or rejected web request can be logged at block 314. For example, once a web request is rejected, its status can be stored on its web request log file, as discussed above. These web request log files can be reviewed by a requester at the requester console in order to ascertain why the web request was rejected. The requester can also revise and resubmit the web request as appropriate at the requester console. Alternatively, the rejected web request can be sent directly to the requester console for further review by the requester.

If the web request is approved at block 312, a new web request can be sent to the application by the middleware at block 306. An embodiment of a process associated with block 312 (e.g., a process that occurs between blocks 310 and 306 when a web request is approved) is discussed below with reference to FIG. 5. The new web request can be generated using the saved web request. Thereafter, at block 308, as with web requests that do not include a call to tagged operations that are associated with a review tag or a call to review method, the application called by the new web request can be allowed to execute to completion per the instructions of the new web request.

It will be appreciated that process 300 is illustrative and that variations and modifications are possible. For example, in some embodiments, a web request saved at block 310 is not directly sent to the reviewer console for approving/disapproving at block 312. Instead, the web request can be logged and subsequently accessed by a reviewer such that the web request is provided at the reviewer console for review by the reviewer. Furthermore, the simulation of the web request at the reviewer console can run differently based on the review tag associated with operations of the web request. Some review tags can even include a call to a method at the middleware for running a check function on the web request before simulation of the web request is sent to the reviewer console or displayed at the user output of the reviewer console. For example, spellcheck or other compliance check functions can be run on the web request before simulating the web request at the review console and the result of the functions can be provided at the review interface for the reviewer's reference.

In addition, in some embodiments, the middleware (e.g., middleware 105 of FIG. 1, which can include WSGI middleware) can perform operations on the web request such that it can be properly executed when it reaches the application. The middleware can also determine whether the web request is properly authenticated and authorized before sending the web request to the application at block 306. Again, as mentioned above, methods of the present invention can initiate a review of a web request even if it is authenticated and authorized. However, if a web request is not authorized and authenticated, then the web request is rejected and further review of the web request is not necessary regardless of whether the web request would result in the execution of a "high risk" operation.

As indicated above, in some embodiments, block 304 of process 300 decides whether a web request, upon execution, would invoke a "high risk" operation of an application. An example of a sub-process associated with block 304 will now be described.

Figure 4:
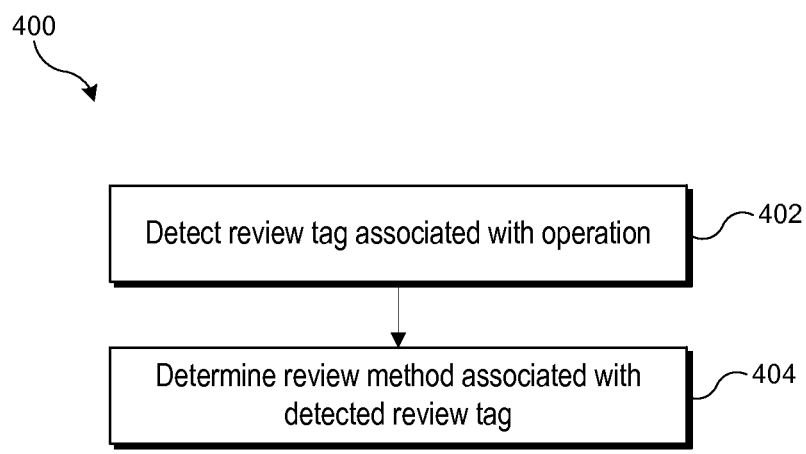
FIG. 4 shows a flow diagram of a sub-process associated with a process of FIG. 3 according to an embodiment of the present invention.

FIG. 4 shows a flow diagram of a sub-process 400 associated with process 300 of FIG. 3 according to an embodiment of the present invention. More specifically, sub-process 400 can occur at block 304 of process 300 when a review tag is detected.

Process 400 can begin at block 402, with detecting whether a review tag or a call to a review method is associated with an operation of an application invoked upon execution of a web request received at block 302 of process 300. For instance, as described above, middleware (e.g., middleware 105) can inspect a received web request (e.g., the web request received at block 302 of process 300) to determine whether the web request will, upon execution, invoke a "high risk" operation of an application (e.g., whether a review tag is associated with the operation). When the middleware detects a review tag associated with the operation, process 400 can perform a subsequent action.

For example, at block 404, a review method associated with the detected review tag can be determined. As mentioned above, review methods can be included in the middleware of the present invention. Thus, the need to include the review method with the web request or within the application called upon by the web request is obviated. Instead, a call to a review method can be used to determine a review method included in the middleware. Alternatively, the middleware can determine a review method using a review tag instead of a call to a review method. For example, the middleware can access information concerning which review methods correspond to which review tags. This information could be used to determine a review method using the review tag. Once the review method is determined by the middleware, it can be invoked before or after saving the web request (e.g., at block 310 of process 300).

It will be appreciated that process 400 is illustrative and that variations and modifications are possible. For example, in some embodiments, a review tag associated with an operation can be detected at block 402 when an exception is thrown while executing a web request. In these embodiments, review methods associated with the review tag can still be determined at block 404 using the methods described above.

As indicated above, in some embodiments, block 312 of process 300 decides whether a web request that, upon execution, would invoke a "high risk" operation of an application has been approved or disapproved. An example of a sub-process associated with block 312 will now be described.

Figure 5:
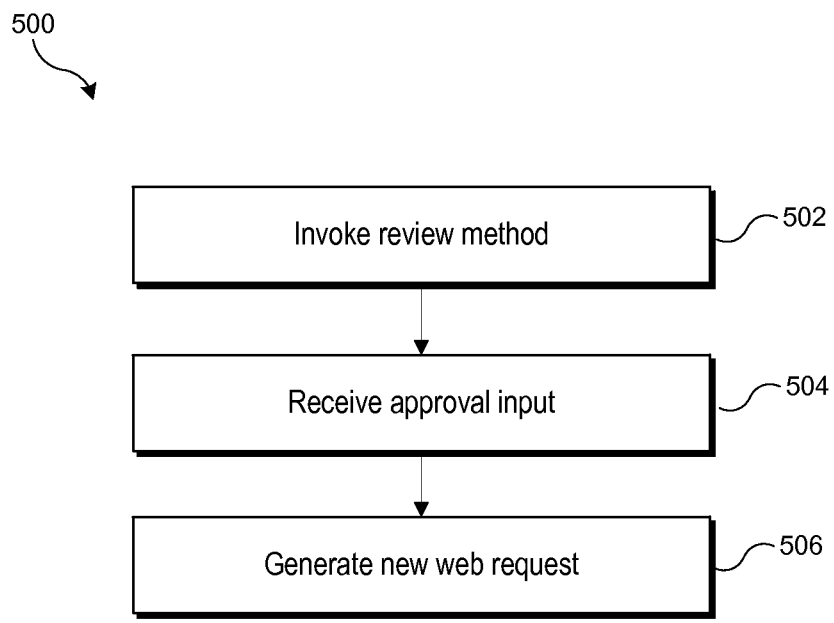
FIG. 5 shows a flow diagram of another sub-process associated with processes of FIGS. 2 and 3 according to an embodiment of the present invention.

FIG. 5 shows a flow diagram of a sub-process 500 associated with process 300 of FIG. 3 according to an embodiment of the present invention. More specifically, sub-process 500 can occur at block 312 of process 300 when web requests are approved.

Process 500 can begin at block 502, with invoking a review method (e.g., the review method determined at block 404 of process 400). The review method can control which reviewer(s) review the web request at issue and/or how the web request at issue should be simulated for the reviewer(s).

As discussed earlier, the review method can begin by sending or providing the saved web request to a reviewer console (e.g., reviewer consoles 125 and 726, as shown in FIGS. 1 and 7, respectively) where a human reviewer can review the web request. Alternatively, the web request can merely be logged, instead of being sent to the reviewer console, and later accessed by a reviewer in order to review the web request. The web request can be reviewed at the review console by simulating the execution of the web request on a review interface at a user output (e.g., user output 736 of FIG. 7). For example, the reviewer can use the review interface to search for and/or view saved web requests received by the review console or those logged at the application server. Thereafter, the reviewer can select a saved web request, thereby initiating a simulation of the web request. After viewing a simulation of the web request, the reviewer can provide input corresponding to an approval or disapproval of the web request, e.g., based on whether it is performing a correct and/or appropriate action.

If the web request is approved by the reviewer, input corresponding to an approval of the web request can be received by middleware at block 504. Examples of review interfaces at which a reviewer can send such input are described in further detail below.

At block 506, a new web request can be generated using the saved web request once the middleware determines that the received input corresponds to an approval of the web request. This new web request can be adapted such that it can execute without invoking a review method even if it includes a call to a "high risk" operation and even if a review tag is associated with the "high risk" operation.

As indicated above, in some embodiments, portions of the review method discussed herein can be implemented, e.g., at consoles 120 and 125 of FIG. 1, and can present various user interface screens. An example of a review interface screen that can be displayed at a user output of a review console (e.g., review console 726, as shown in FIG. 7) will now be described.

Figure 6:
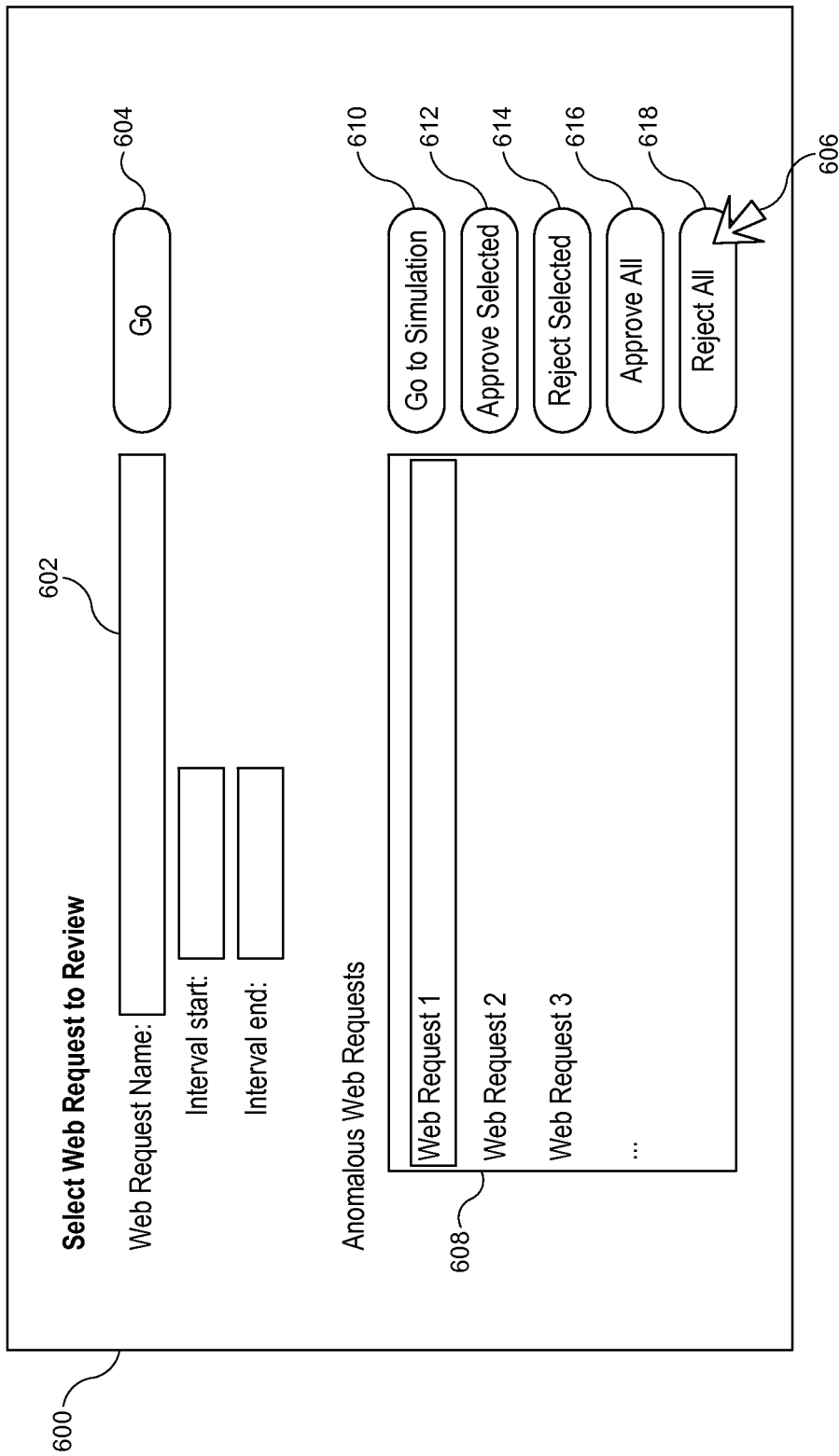
FIG. 6 shows a user interface screen that can be presented to a reviewer for manually initiating a web request review according to an embodiment of the present invention.

FIG. 6 shows user interface screen 600 that can be presented to a reviewer for manually initiating a web request review according to an embodiment of the present invention. User interface screen 600 can be implemented, e.g., at user output 736 of FIG. 7. User interface screen 600 can allow an operator to view web requests received by an application server and identify a tagged web request for review. Text box 602 can allow the user to enter the name of the web request and a time interval of interest. Thereafter, the reviewer can select "go" button 604 (e.g., using cursor 606) to populate a list of web requests at selection box 608 based on the entry in text box 602. In some embodiments, auto completion suggestions or other mechanisms can also be used for speed entry of web requests. In addition, selection box 608 can also be pre-populated with a list of the most recent tagged web requests, e.g., as detected by middleware in processes 200 or 300.

From box 608, a reviewer can select a web request to simulate by selecting the web request and selecting "Go to Simulation" button 610 (e.g., using cursor 606). Once the selection is made, the web request can be simulated and presented to the reviewer. At the conclusion of the simulation, the reviewer is returned to screen 600, whereupon the reviewer can approve or disapprove the web request by selecting "Approve Selected" button 612 or "Reject Selected" button 614. As discussed above with regard to processes 200 and 300, disapproved or rejected web requests can be logged, while new web requests can be sent to the application after being generated using the saved web request. Once approved or rejected, the web request can be removed from box 608. However, in some embodiments, approved web requests can be available for further review, e.g., where more than one reviewer's input can be required to approve or reject the web request.

After approving or rejecting one web request, the reviewer can select another web request from box 608 to review and approve or disapprove. The reviewer can approve or reject additional web requests one-by-one. Alternatively, "Approve All" button 616 or "Reject All" button 618 can be used to approve or reject all of the web requests contained in box 608 after those web requests have been reviewed.

Additional details concerning the variety of standalone computer systems and/or distributed computing architectures in which methods and systems of reviewing web requests can be implemented are included in the following figure. FIG. 7 shows additional details of an embodiment of computer system 100—computer system 700—that can be used to implement a review method (or aspects thereof) in a distributed computing architecture according to an embodiment of the present invention.

As with computer system 100, computer system 700 can have a modular design that incorporates a number of modules 702 (e.g., blades in a blade server implementation); while two modules 702 are shown, any number can be provided. Each module 702 can include processing unit(s) 704 and local storage 706.

Processing unit(s) 704 can include a single processor, which can have one or more cores, or multiple processors. In some embodiments, processing unit(s) 704 can include a general-purpose primary processor as well as one or more special-purpose co-processors such as graphics processors, digital signal processors, or the like. In some embodiments, some or all processing unit(s) 704 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 704 can execute instructions stored in local storage 706. Any type of processors in any combination can be included in processing unit(s) 704.

Local storage 706 can include volatile storage media (e.g., conventional DRAM, SRAM, SDRAM, or the like) and/or non-volatile storage media (e.g., magnetic or optical disk, flash memory, or the like). Storage media incorporated in local storage 706 can be fixed, removable or upgradeable as desired. Local storage 706 can be physically or logically divided into various subunits such as a system memory, a read-only memory (ROM), and a permanent storage device. System memory can include a read-and-write memory device, e.g., a volatile read-and-write memory, such as dynamic random access memory, and can store some or all of the instructions and data that processing unit(s) 704 need at runtime. ROM can store static data and instructions that are needed by processing unit(s) 706. Permanent storage devices can include a non-volatile read-and-write memory device, e.g., flash memory or magnetic disk, and can store instructions and data even when module 702 is powered down. The term "storage medium" as used herein includes any medium in which data can be stored indefinitely (subject to overwriting, electrical disturbance, power loss, or the like) and does not include carrier waves and transitory electronic signals passing wirelessly or over wired connections.

In some embodiments, local storage 706 can store one or more software programs to be executed by processing unit(s) 704, such as an operating system and/or programs implementing various functions, such as execution of all or part of a processing job or other processes as described herein. "Software" refers generally to sequences of instructions that, when executed by processing unit(s) 704 cause computer system 700 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 704. Software can be implemented as a single program or a collection of separate programs or program modules that interact as desired. From local storage 706 (or non-local storage described below), processing unit(s) 704 can retrieve program instructions to execute and data to process in order to execute various operations described herein.

In some computer system 700, multiple modules 702 can be interconnected via bus 708, forming a local area network that supports communication between modules 702 and other components of computer system 700. Bus 708 can be implemented using various technologies including server racks, hubs, routers, etc.

Network interface 710 (e.g., a wide area network or WAN) can provide data communication capability between the local area network (e.g., bus 708) and a larger network, such as the Internet. Conventional or other communications technologies can be used, including wired (e.g., Ethernet, IEEE 802.3 standards) and/or wireless technologies (e.g., Wi-Fi, IEEE 802.11 standards).

In some embodiments, local storage 706 is intended to provide working memory for processing unit(s) 704, providing fast access to programs and/or data to be processed while reducing traffic on bus 708. Storage for larger quantities of data can be provided on the local area network by one or more mass storage subsystems 712 that can be connected to bus 708. Mass storage subsystem 712 can be based on magnetic, optical, semiconductor, or other data storage technologies. Direct attached storage, storage area networks, network-attached storage, and the like can be used. Any data stores or other collections of data described herein as being produced or consumed by servers can be stored in mass storage subsystem 712. In some embodiments, additional data storage resources can be accessible via network interface 710 (potentially with somewhat increased latency). Mass storage subsystem 712 can be used to store user activity logs, one or more databases that can include various data tables, and/or other large data objects, examples of which are described below.

In some embodiments, computer system 700 can operate in response to web requests received via network interface 710 or bus 708. Requester console 714 can be provided to allow a requester (e.g., a system operator or administrator) to interact directly with computer system 700, e.g., for purposes of monitoring, testing, troubleshooting, upgrading, or the like, as well as for purposes of allowing requesters to submit web requests. Requester console 714 can include conventional computer components such as processor 716, storage device 718, network interface 720, user input device 722, and user output device 724.

In some embodiments, requester console 714 can be physically remote from the rest of computer system 700 and can be connected via network interface 710. One of modules 702 can implement a supervisory function and assign discrete tasks to other modules 702 in response to received requests. Conventional work allocation techniques can be used. Such operations can generally be automated. Further, in some embodiments, network interface 710 can connect multiple computer systems 700 to each other, providing scalable solutions capable of managing high volumes of activity. Thus, a distributed computing architecture can be distributed across any number of physical computer systems without geographic constraint. Conventional or other techniques for managing computer systems or server systems and server farms (collections of server systems that cooperate) can be used, including dynamic resource allocation and reallocation.

In some embodiments, reviewer console 726 can be provided to allow a reviewer (e.g., a system operator or administrator) to interact directly with computer system 700, e.g., for purposes of monitoring, testing, troubleshooting, upgrading, or the like, as well as for purposes of allowing reviewers to review web requests. Reviewer console 726 can include conventional computer components such as processor 728, storage device 730, network interface 732, user input device 734, and user output device 736. In some embodiments, reviewer console 726 can be physically remote from the rest of computer system 700 and can be connected via network interface 710.

Processors 716, 728 and storage devices 718, 730 can be similar to processing unit(s) 704 and local storage 706. Suitable devices can be selected based on the demands to be placed on requester and reviewer consoles 714, 726; for example, consoles 714, 726 can be implemented as a "thin" client with limited processing capability. Network interfaces 720, 732 can provide a connection to bus 708 and/or directly to network interface 710 (e.g., a WAN). User input devices 722 and 734 can include any device (or devices) via which a user can provide signals to consoles 714 and 726, respectively. Consoles 714, 726 can interpret the signals as indicative of particular user requests or information. In various embodiments, user input devices 722 and 734 can include any or all of a keyboard, touch pad, touch screen, mouse or other pointing device, scroll wheel, click wheel, dial, button, switch, keypad, microphone, and so on.

User output devices 724, 736 can include any device via which consoles 714, 726 can provide information to a user. For example, user output devices 724, 736 can include a display for displaying images generated by or delivered to consoles 714, 726. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that functions as both an input and an output device. In some embodiments, other user output devices 724, 736 can be provided in addition to or instead of a display. Examples include indicator lights, speakers, tactile "display" devices, printers, and so on.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 704 can provide various functionalities for server system 700, including any of the functionalities described herein as being performed by a server, analytics system, or distributed processing system.

It will be appreciated that computer system 700 is illustrative and that variations and modifications are possible. Computer system 700 can have other capabilities not specifically described here. Further, while computer system 700 is described with reference to particular blocks, it is to be understood that these blocks are defined for convenience of description and are not intended to imply a particular physical arrangement of component parts. For instance, different blocks can be, but need not be, located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Also, while a number of specific embodiments were disclosed with regard to reviewing web requests associated with "high risk" operations, a person of skill in the art will recognize instances where embodiments can be used to review web requests associated with other types of operations. For example, a person of skill in the art will readily appreciate that any kind of web request can be reviewed according to the methods of the present invention, including web requests that are currently undergoing an evaluation or web requests that are often erroneously created as well as other types of web requests not specifically mentioned herein.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer-readable storage media; suitable media include magnetic disk or tape, optical storage media such as compact disk (CD) or DVD (digital versatile disk), flash memory, and other non-transitory media. Computer-readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    receiving, by a computer system from a requester, a first Hypertext Transfer Protocol (HTTP) request to invoke an operation of an application;
    detecting, by the computer system, that a review tag is associated with the operation;
    based on detecting the review tag, stopping an execution of the first HTTP request before the execution invokes the operation of the application;
    determining, by the computer system, a review method associated with the review tag;
    saving, by the computer system, information for the first HTTP request, the saved information for the first HTTP request including a state of the first HTTP request, the state including one or more attributes of the first HTTP request;
    invoking, by the computer system, the review method, the review method including providing the saved information to a reviewer;
    receiving, by the computer system, input corresponding to an approval or a rejection of the first HTTP request by the reviewer; and
    upon determining, by the computer system, that the received input corresponds to the approval of the first HTTP request:
        generating, by the computer system, a new HTTP request to invoke the operation of the application using the saved information for the first HTTP request; and allowing, by the computer system, the new HTTP request to be executed and invoke the operation of the application.

2. The method set forth in claim 1 wherein the requester corresponds to an operator that is authorized to submit the first HTTP request at the computer system.

3. The method set forth in claim 1 wherein the saved information for the first HTTP request is provided to the reviewer subsequent to receiving input corresponding to a selection of the saved information for the first HTTP request by the reviewer.

4. The method set forth in claim 1 wherein detecting that the review tag is associated with the operation further comprises:
inspecting the received request;
identifying the operation in the received request; and
determining that the review tag is associated with the operation.

5. The method set forth in claim 1 wherein the new HTTP request is executed at an application server of the computer system.

6. The method set forth in claim 5 wherein the association of the review tag with the operation is detected when an exception is thrown by the application executing on the application server and the saved information for the first HTTP request is provided to middleware executing on the application server.

7. The method set forth in claim 5 wherein the review method is stored in middleware executing on the application server.

8. A method comprising:
receiving, by a computer system from a requester, a first Hypertext Transfer Protocol (HTTP) request to invoke an operation of an application executing on an application server of the computer system;
initiating execution, by the computer system, of the operation;
stopping, by the computer system, the execution of the operation before the execution of the operation is complete;
saving, by the computer system, information for the first HTTP request, the saved first HTTP including a state of the request, the state including one or more attributes;
providing the saved information for the first HTTP request to middleware executing on the application server;
detecting, by the computer system, a review tag associated with the operation;
determining, by the computer system, a review method associated with the review tag;
invoking, by the computer system, the review method, the review method including providing the saved information to a reviewer;
receiving, by the computer system, input corresponding to an approval or a rejection of the first HTTP request by the reviewer; and
upon determining that the received input corresponds to the approval of the first HTTP request:
generating, by the computer system, a new HTTP request using the saved information for the first HTTP request;
providing, by the computer system, the new HTTP request at the application; and
allowing, by the computer system, the new HTTP request and the operation of the application to be executed upon determining that the received input corresponds to the approval of the first HTTP request.

9. The method set forth in claim 8 wherein the requester corresponds to an operator that is authorized to submit the first HTTP request at the computer system.

10. The method set forth in claim 8 wherein executing the operation is stopped when an exception is thrown while executing the operation.

11. The method set forth in claim 8 wherein the review method is stored in the middleware executing on the application server.

12. The method set forth in claim 8 wherein the saved information for the first HTTP request is provided to the reviewer subsequent to receiving input corresponding to a selection of the saved information for the first HTTP request by the reviewer.

13. The method set forth in claim 8 wherein the programming language of the application corresponds to an interpreted programming language.

14. A computer system comprising:
a network interface; and
a processor coupled to the network interface and configured to:
receive, from a requester, a first Hypertext Transfer Protocol (HTTP) request to invoke an operation of an application;
detect that a review tag is associated with the operation;
determine a review method associated with the review tag;
save information for the first HTTP request, the saved information for the first HTTP request including a state of the first HTTP request, the state including one or more attributes;
invoke the review method, the review method including providing the saved information to a reviewer;
receive input corresponding to an approval or a rejection of the first HTTP request by the reviewer; and
upon determining that the received input corresponds to the approval of the first HTTP request:
generate a new HTTP request using the saved information for the first HTTP request; and
allow the new HTTP request to be executed and invoke the operation of the application upon determining that the received input corresponds to the approval of the first HTTP request.

15. The computer system of claim 14 wherein a requester corresponds to an operator that is authorized to submit the first HTTP request at the computer system.

16. The computer system of claim 14 wherein the saved information for the first HTTP request is provided to the reviewer subsequent to receiving input corresponding to a selection of the saved information for the first HTTP request by the reviewer.

17. The method set forth in claim 14 wherein the programming language of the application corresponds to a compiled programming language.

18. The computer system of claim 14 wherein the new HTTP request is executed at an application server of the computer system.

19. The computer system of claim 18 wherein detecting the review tag is performed by middleware executing on the application server.

20. The computer system of claim 18 wherein the review method is stored in middleware executing on the application server.

* * * * *